(12) United States Patent
Scott

(10) Patent No.: US 6,857,258 B2
(45) Date of Patent: Feb. 22, 2005

(54) SELF ADJUSTING VERTICAL SHAKER

(76) Inventor: Phillip Ray Scott, 29486 Corral Ct. North, Coarse Gold, CA (US) 93614

(*) Notice: Subject to any disclaimer, the term of this patent is extended or adjusted under 35 U.S.C. 154(b) by 25 days.

(21) Appl. No.: 10/613,837

(22) Filed: Jul. 3, 2003

(65) Prior Publication Data

US 2005/0000204 A1 Jan. 6, 2005

(51) Int. Cl.$^7$ .............................................. A01D 46/00
(52) U.S. Cl. .......................................... 56/330; 56/331
(58) Field of Search ............................... 56/328.1, 330, 56/340.1, 327.1

(56) References Cited

U.S. PATENT DOCUMENTS

| | | | |
|---|---|---|---|
| 4,022,001 A | * | 5/1977 | Burton .......................... 56/330 |
| 4,251,983 A | * | 2/1981 | Burton .......................... 56/330 |
| 4,291,526 A | * | 9/1981 | Hiyama et al. ................ 56/330 |
| 4,341,062 A | | 7/1982 | Scudder ......................... 56/330 |
| 4,418,521 A | | 12/1983 | Orlando et al. ............... 56/330 |
| 5,355,667 A | | 10/1994 | Scott ............................ 56/330 |
| 5,423,166 A | * | 6/1995 | Scott ............................ 56/330 |
| 5,660,033 A | * | 8/1997 | Korthuis et al. .............. 56/330 |
| 5,813,910 A | | 9/1998 | Meester et al. ............. 460/113 |

* cited by examiner

Primary Examiner—Meredith C. Petravick
(74) Attorney, Agent, or Firm—Henry M. Stanley (57) ABSTRACT

A crop picking head assembly has a known oscillation generating head supported in a head support frame suspended from a harvester framework by two pairs of depending arms. One pair of arms is variable in length to adjust picking head height and the other pair is fixed in length. The picking head has a variety of crop contacting rod arrays to accommodate various cordon types supporting extended rows of crop foliage, such as grape vines. The harvester may carry one such picking head on one side of the vine row or may carry mirror image heads, one on each side of the vine row.

28 Claims, 12 Drawing Sheets

SELF ADJUSTING VERTICAL SHAKER

BACKGROUND OF THE INVENTION

1. Field of the Invention

The invention described herein relates to a grape harvesting head and more specifically to a harvesting head supported in a harvester framework, wherein the framework is driven over the ground along extended rows of vines carrying a crop supported by cordons spaced along the extended rows.

2. Description of the Prior Art

U.S. Pat. No. 4,341,062, Scudder, for a Coffee Harvester, describes an oscillation generating head for use in harvesting coffee beans from coffee bushes. Scudder's harvester travels alongside the coffee bushes and includes an array of tines extending horizontally from a vertically disposed shaft that is driven in an oscillatory fashion by the oscillation generating head. The oscillating shaft is allowed to rotate through 360'. The array of tines engages and travels past the coffee bushes.

U.S. Pat. No. 5,355,667, Scott, describes a single head grape and raisin harvester with a single oscillating shaker head that is said to center itself on a row of grape vines engaged by the harvester. The harvester is towed by a tractor and uses the shaker disclosed in the aforementioned Scudder '062 patent. The shaker drives a shaft in an oscillatory manner. A plurality of shaker tines extend radially from the shaft. The shaft is allowed to rotate through 360' as the oscillating tines engage and are drawn past a row of grape vines by the tractor.

U.S. Pat. No. 5,813,910, Meester et al., also includes disclosure of an oscillating shaker head, wherein the oscillation is provided by an eccentric weight assembly similar to those described in the previously-mentioned '062 and '667 patents. The Neester et al. shaker is adjustable in oscillation amplitude while the apparatus is operating. The oscillation from the head is imparted to a brush having a plurality of rows of radially extending tines. The radially extending tines on the shaft form a shaker brush which is free to rotate through 360'.

U.S. Pat. No. 4,418,521, Orlando et al., discloses a harvester for grapes growing on tines having a force balance assembly imparting oscillation to groups of "beater rods" or tines that extend from their mounts rearwardly from the harvester. The tines are disposed to disturb the vines in an oscillatory fashion in a substantially horizontal plane. The "beater rods" are positioned to engage the vines on each side of the vine row.

Figure 2:
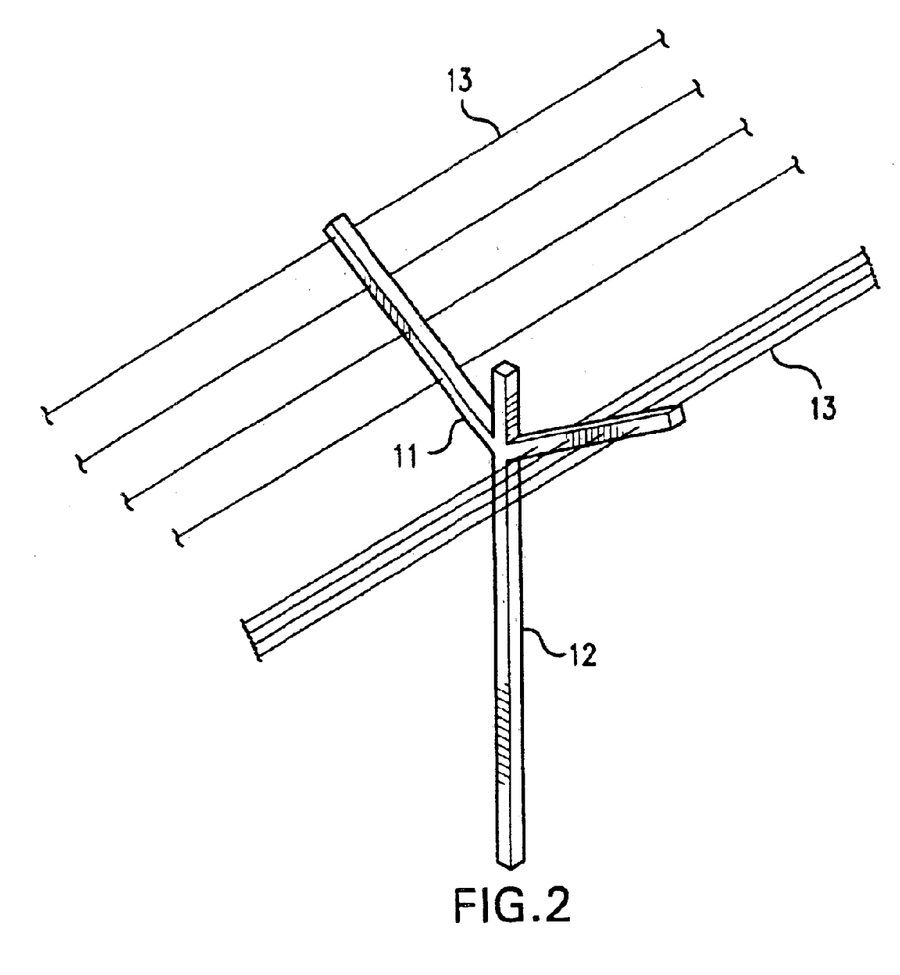
FIG. 2 is a perspective of a "V" shaped cordon supported vine trellis.
Figure 3:
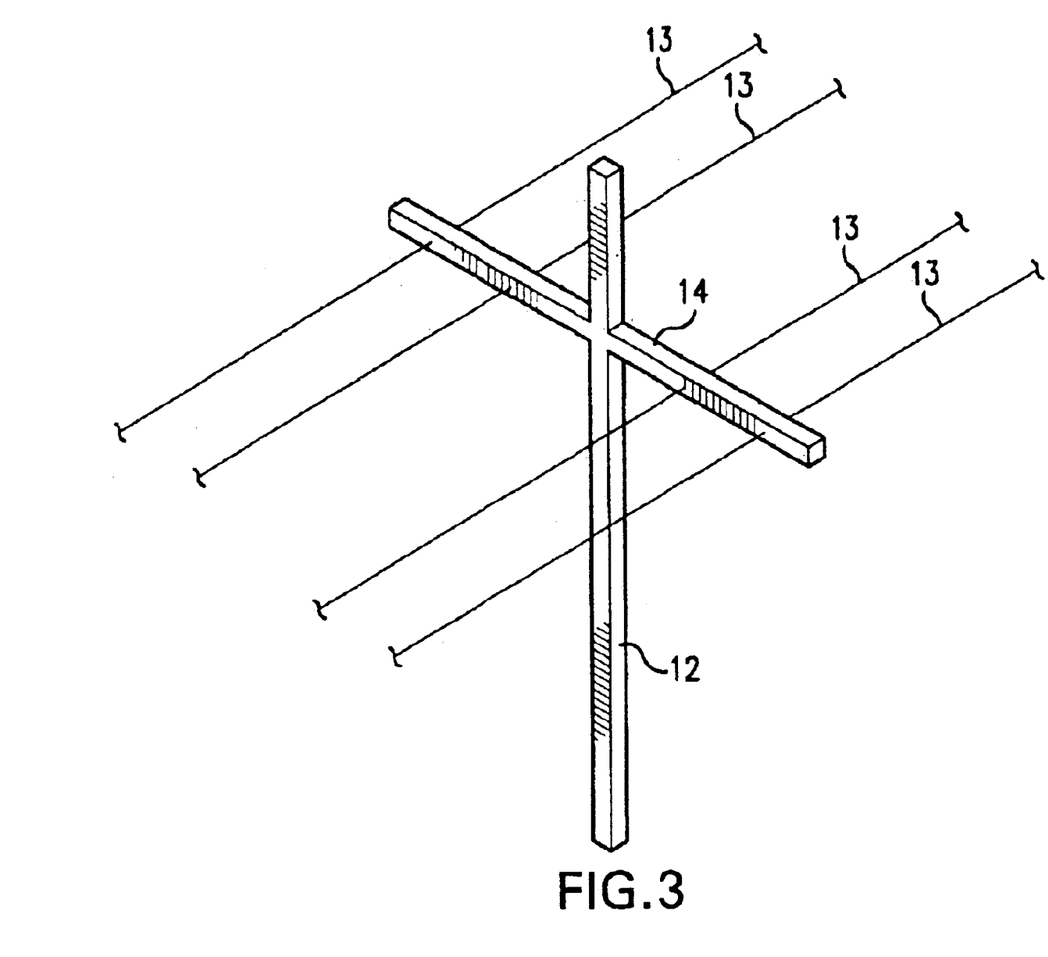
FIG. 3 is a perspective of a straight cross arm cordon supported vine trellis.

There is a style of vine training for growing grapes that is referred to as cordon supported. One type of cordon supported training for grape vines is shown in FIG. 2 of the drawings, wherein a "V" shaped cross arm 11 has an upright support post 12 embedded in and extending from a ground surface. A plurality of support wires 13 extend between spaced ones of the "V" shaped supports so that crops, such as grape vines, may be grown and supported along the lengths of the wires 13. The "V" shaped cross arm is called a cordon. FIG. 3 shows an alternate form of support for a vine type plant, wherein the upright post 12 supports a straight cross arm 14. The cross arm 14 is also called a cordon and has a plurality of the wires 13 running along the length of a row of growing vine crop. The wires 13 are supported by spaced cordon assemblies, such as illustrated in FIG. 3.

The cordons divide the vine into two distinct fruiting areas, one on each side of the vine. In many instances, grape crops supported on cordon systems are difficult to harvest mechanically and must therefore be hand picked. Sometimes it is desirable to mechanically harvest crops grown on cordon systems, for example, when the grapes are not of high enough quality to be used for fresh fruit consumption. These grapes are called strippings. Hand harvesting of strippings, or grapes that are left over after hand picking, is not economically feasible. Mechanical harvesting of grapes grown on cordon systems has presented problems for current styles of picking mechanisms, which tend to shake the vine from side to side to effect fruit removal. Additionally, the cordon heights vary from row to row and field to field, which requires that current styles of picking mechanisms must be changed in height above the ground during mechanical picking operations to effectively harvest the fruit. Vineyards grown on cordon systems in rolling hills exhibit distances between the vines and the ground on opposite sides of the vine rows that may vary by up to forty inches. This variation of crop level above the ground in the same cordon supported vine row is the product of a number of circumstances, such as soil tilling, which causes the soil to shift downward on the hillside, creating a "bench" effect as soil is deposited from up the hill down toward the area under vine. In this fashion the downhill side of the vine row may become closer to the ground. Since it is desirable to maintain contact with the cordon on the side of the vine row being harvested, this unpredictable and ever-changing cordon height presents a problem for picking mechanisms which are not adjustable in height over the ground surface.

SUMMARY OF THE INVENTION

The invention herein relates to a crop picking head assembly for mounting in a crop harvester framework that is configured to travel along an extended row of plant foliage for the purpose of dislodging a crop growing along the length of the row. The picking head has an oscillation generating head having an input drive member and an oscillation generating head support frame for mounting the oscillation generating head for providing rotational oscillation in a substantially vertical plane. A pair of fixed length laterally spaced arms are each mounted to the crop harvester framework at an upper end and are pivotally attached to the support frame at a lower end. A pair of variable length laterally spaced arms are each mounted to the crop harvester framework at an upper end and are pivotally attached to the support frame at a lower end. Crop contact means is mounted on the oscillation generating head in position to approach the plant foliage from beneath. A drive motor is mounted on the support frame, having a motor output in engagement with the oscillation generating head input drive member, and providing oscillation generating head net rotation that urges the crop contact means into the crop foliage. A stop member is provided on the support frame for limiting the net rotation of the oscillation generating head in the substantially vertical plane.

A crop picking head assembly is configured for mounting in a crop harvester framework that is in turn configured to travel along an extended row of plant foliage supported on cordons for the purpose of dislodging a crop growing along the row. The picking head assembly includes an oscillation generating head having a centrally located input drive member and an oscillation generating head support frame for mounting the oscillation generating head for rotation in a substantially vertical plane. A pair of fixed length laterally spaced arms are each mounted to the crop harvester framework at an upper end and are pivotally attached to the support frame at a lower end. A pair of variable length laterally spaced arms are each mounted to the crop harvester framework at an upper end and are pivotally attached to the support frame at a lower end. Crop contact means is mounted on the oscillation generating head in position to approach the cordons from beneath and to contact the cordons during oscillation. A drive motor is mounted on the support frame having a motor output in engagement with the oscillation generating head input drive member and providing oscillation generating head net rotation urging the crop contact means into the crop foliage. Stop means is mounted on the support frame for limiting the net rotation of the oscillation generating head in the substantially vertical plane.

The invention relates to a harvester for crops grown on plant foliage in an extended row and supported on cordons along the row. The harvester includes a harvester framework having a longitudinal centerline. Means is provided for supporting the harvester framework and for contacting and allowing harvester framework movement along the centerline over an underlying surface. Power means is coupled to the means for supporting for moving the harvester framework over the underlying surface. A crop picking head is mounted on the harvester framework on one side of the centerline so that the picking head is positionable on one side of the extended row and below the cordons. The crop picking head includes an oscillation generating head having an input drive member. An oscillation generating head support frame for mounting the oscillation generating head for rotational oscillation in a substantially vertical plane is also provided. A pair of fixed length laterally spaced arms are each mounted to the crop harvester framework at an upper end and are pivotally attached to the support frame at a lower end. A pair of variable length laterally spaced arms are each mounted to the crop harvester framework at an upper end and are pivotally attached to the support frame at a lower end. Crop contact means is mounted on the oscillation generating head in position to approach the plant foliage from beneath. A drive motor is connected to the power means mounted on the support frame. The drive motor has a motor output in engagement with the oscillation generating head drive member to thereby provide head oscillation as well as net rotation of the oscillation generating head that urges the crop contact means into the crop foliage. Stop means is also provided and mounted on the support frame for limiting the net rotation of the oscillation generating head in the substantially vertical plane.

DESCRIPTION OF THE PREFERRED EMBODIMENTS

Figure 1:
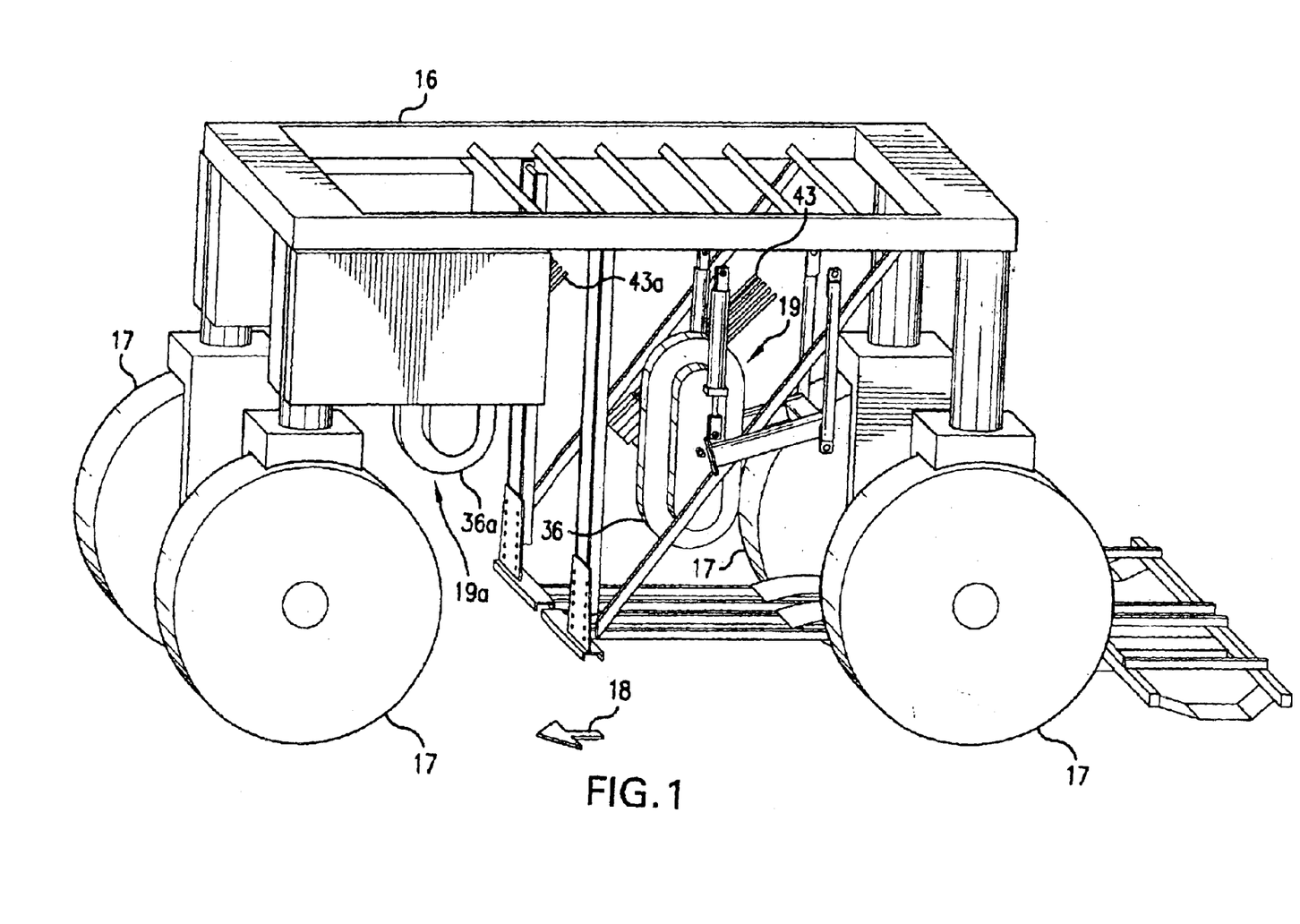
FIG. 1 is a perspective of a harvester framework carrying the shaker head of the present invention and configured to travel along the length of a vine row.

A harvester framework 16 is shown in FIG. 1 of the drawings, wherein a set of four supporting wheels 17 are attached to the harvester frame. The harvester framework 16 has a longitudinal axis extending in the direction of the arrow 18 in FIG. 1 and also indicating the forward direction of travel for the harvester framework when the wheels 17 are powered by a power source (not shown). A shaker head assembly 19 is shown suspended from an upper portion of the framework 16 and located to the near side in FIG. 1 of the framework longitudinal centerline.

Figure 4:
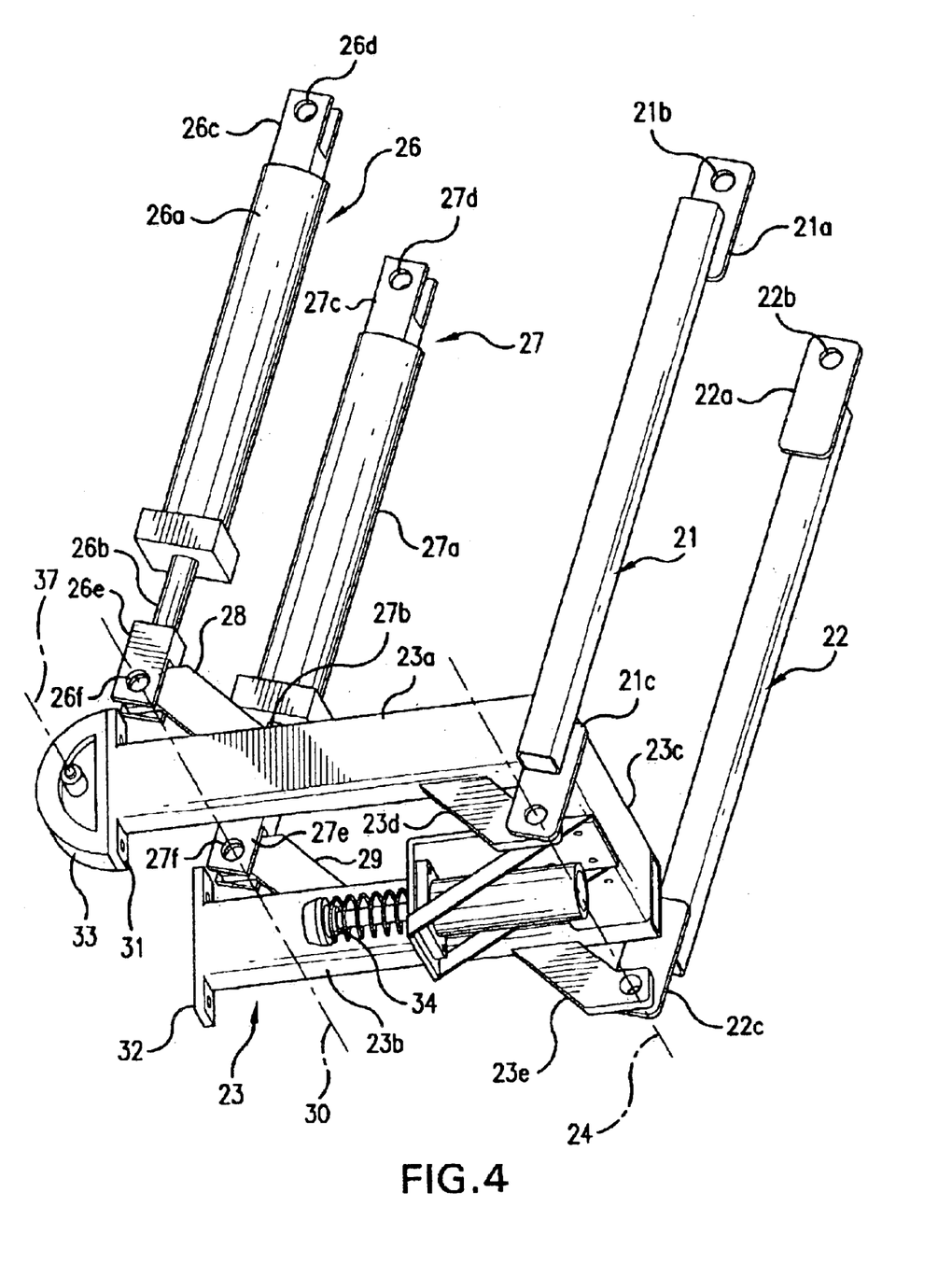
FIG. 4 is a perspective of a head support frame and a pair of spaced forward and a pair of spaced rear support arms in the present invention.

As shown in FIG. 4, the shaker head assembly 19 is suspended from the harvester framework 16 by two rear fixed length arms 21 and 22 with upper plates 21a and 22a attached thereto. The plates 21a and 22a have holes 21b and 22b respectively therein, that accept fasteners (not shown) to hang the arms 21 and 22 from the framework 16. The lower ends of the fixed length arms 21 and 22 have lower plates 21c and 22c attached thereto with aligned holes therein as shown. A shaker head support frame 23 has forward extending arms 23a and 23b and a connecting cross arm 23c. Pivoting supports 23d and 23e are attached to the rearward ends of the forward extending arms 23a and 23b, respectively, having holes therein in alignment with the holes in the lower plates 21c and 22c. The axis 24 seen in FIG. 4 represents rotation axis of the head support frame 23 on the lower ends of the arms 21 and 22. Axis 24 extends through aligned holes in lower plates 21c and 22c and pivot supports 23d and 23e. The fasteners that extend through the mating holes in 21c and 23d and in the mating holes in 22c and 23e are left out of FIG. 4 for clarity. When assembled, the head support frame 23 is allowed to pivot rotationally about the axis 24 shown in FIG. 4.

FIG. 4 also shows a pair of front variable length arms 26 and 27 that are laterally spaced in a fashion similar to that for rear support arms 21 and 22. The front arms are hydraulic devices in the preferred embodiment, having a cylinder portion 26a and 27a and a piston actuated rod portion 26b and 27b, as seen in FIG. 4. Front arm 26 has an upper bracket 26c attached thereto with a hole 26d for accepting a fastener to connect the upper end of arm 26 to the framework 16. In like fashion, the front arm 27 has a bracket 27c attached to the upper end thereof with a hole 27d for accepting a fastener to attach the upper end of arm 27 to the framework 16. The lower end of piston rod 26b has a bracket 26e attached thereto having a hole 26f therein. A member 28 is attached to the arm 23a on the head support frame and has a hole therein in registration with the hole 26f. A fastener is inserted through the hole 26f and the hole in registration therewith in the member 28 to pivotally attach the lower end of forward variable length arm 26 to the head support frame 23. Thus, pivotal movement between the lower end of arm 26 and head support frame arm 23a is allowed. In similar fashion, as seen in FIG. 4, the head support frame arm 23b has a member 29 attached thereto. The lower end of the piston rod 27b of arm 27 has a bracket 27e attached thereto with a hole 27f therein. The hole 27f is in registration with a hole in the member 29, so that a fastener passed through the registered holes will allow pivotal motion between the lower end of the arm 27 and the head support frame arm 23b. The head support frame is therefore pivotable about an axis 30 relative to the lower ends of support arms 26 and 27.

As also shown in FIG. 4, there is a flange 31 formed on the end of head support arm 23a as well as a flange 32 formed on the end of the head support frame arm 23b. Flange 31 is provided to attach to an outside oscillation generating head bearing 33. Flange 32 is configured to receive an inside oscillation generating head support bearing to be described hereinafter in conjunction with FIG. 10. Also seen in FIG. 4 is a shock absorber 34 which serves as a stop for net rotation of the shaker head 19 as will be hereinafter described.

It should be noted that the picking head assembly 19 is herein described as having the variable length arms positioned toward the front of the picking head assembly relative to the travel of the harvester frame. The fixed length arms may as well be positioned toward the front of the direction of travel and the head would function for the intended purpose. The only requirement for a reversal of the fixed length and variable length arms in the orientation of the picking head 19 is that the array of crop contact means (to be hereinafter described) must be positioned on the inside of the picking head as it is mounted on the harvester frame 16 and that the crop contact means extend upwardly and rearwardly relative to the travel of the harvester framework.

Figure 5A:
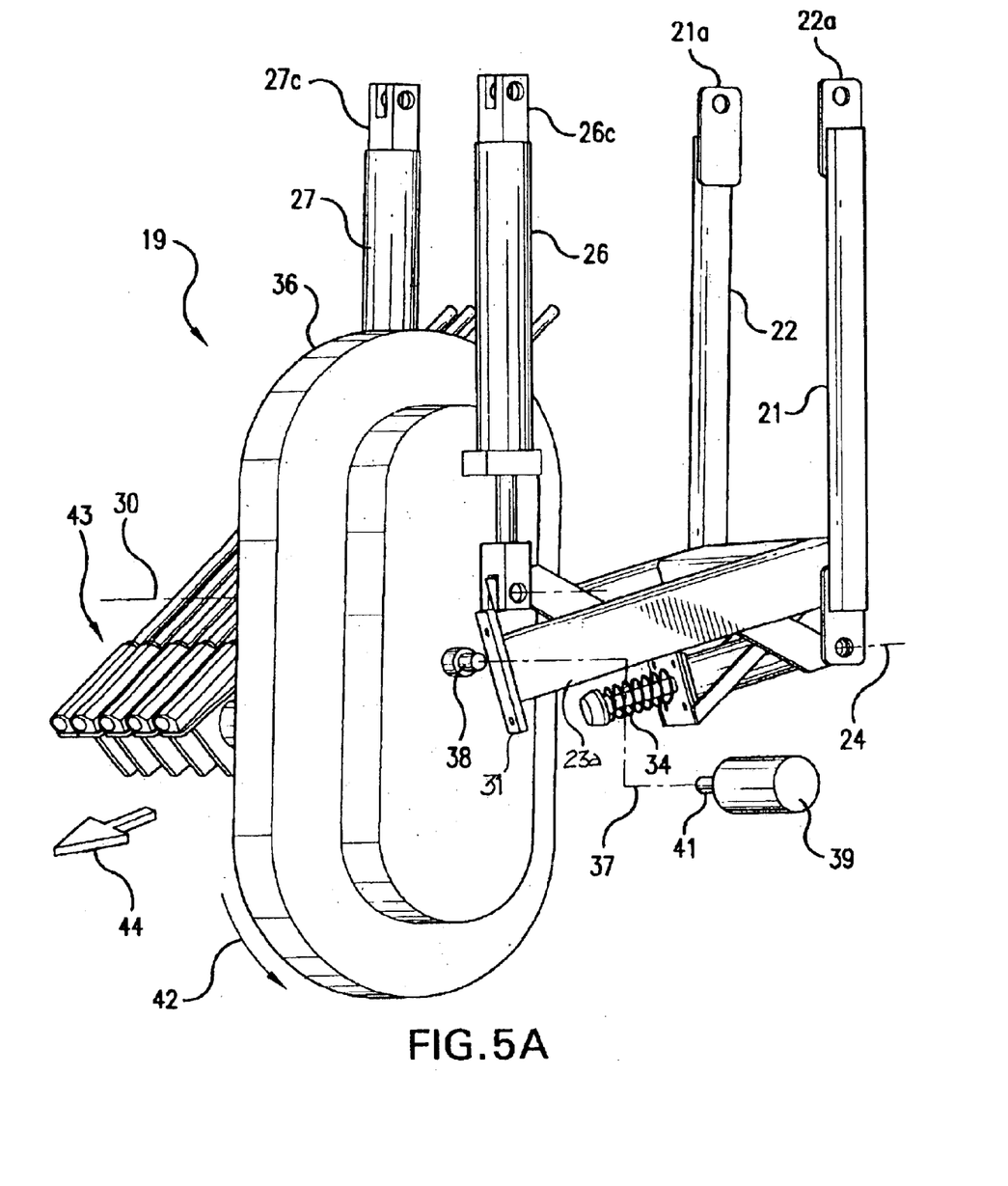
FIG. 5A is a perspective from one side of the shaker head of the present invention.

FIG. 5A is a perspective of the crop picking head assembly of the present invention from the outside of the head assembly, with the outside oscillation generating head bearing assembly 33 (FIG. 4) removed from flange 31 for clarity. A known oscillation generating assembly such as is described in U.S. Pat. No. 4,341,062, Scudder, FIG. 16, is mounted in the outside support bearing 33 for rotation about an axis 37 that is substantially through the center of mass of the oscillation generating head 36. An input shaft for the oscillation generating head 36 is shown at 38 in FIG. 5A. Input shaft 38 for the head 36 is positioned along the axis 37. A motor 39 is shown in FIG. 5A having an output shaft 41 that is coupled to the oscillation generating head input shaft 38. The motor 39 is shown displaced from the input shaft 38 in FIG. 5A for clarity. The rotation of motor 39 is such as to provide a net rotation of the oscillation generating head 36 in the direction of the arrow 42. It should be noted in FIG. 5A that an array of picking rods shown generally at 43 is mounted on the inside of the oscillation generating head, extending upwardly and rearwardly of the direction of travel of the harvester framework indicated by the arrow 44. Pivot axis 30 is shown in the figure, whereby the oscillation generating head 36 is capable of being raised or lowered by retraction and extension, respectively of the variable length arms 26 and 27. Net rotation of the oscillation generating head 36 is stopped by the shock absorber 34 and it is seen that such net rotation will bring the ends of the array of picking rods 43 upward as seen in FIG. 5A. Actuation of the variable length arms 26 and 27 causes the head support frame 23 to pivot about the axis 24 to assume a position in height such that the array of picking rods (or the crop contact array) 43 engages the cross arms 11 and 14 of FIGS. 2 and 3, respectively. A configuration of the crop contact array is different for the cordon 11 and the cordon 14 as will hereinafter be described.

Figure 5B:
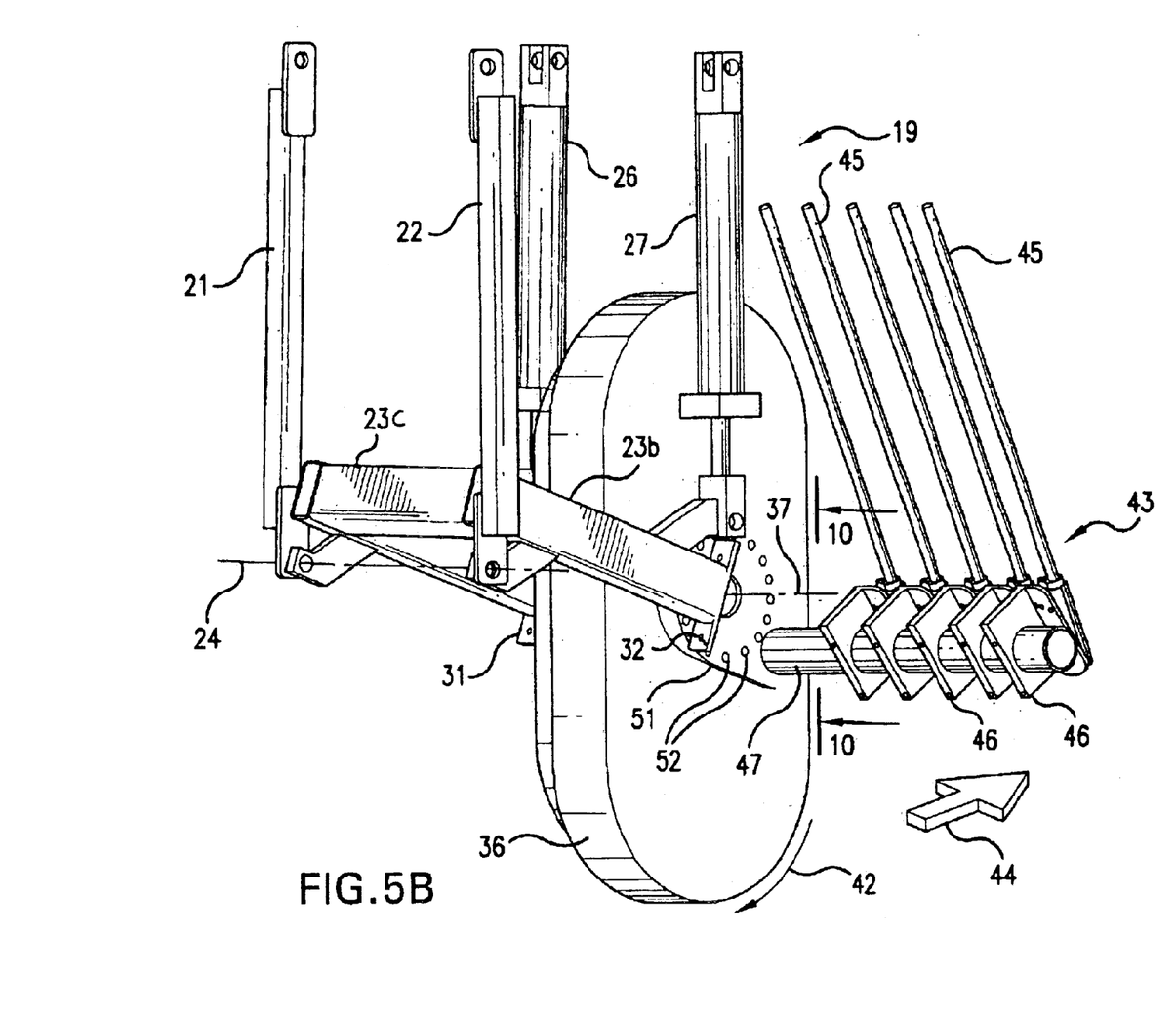
FIG. 5B is a perspective taken from an opposite side of the shaker head of the present invention.

The crop shaker or picking head assembly 19 is shown again in FIG. 5B as seen from a direction opposite to that of the view of FIG. 5A. The forward travel direction when the picking head is mounted in a harvester framework 16 is shown by the arrow 44 and the net rotation of the oscillation generating head 36 is shown by the arrow 42 in FIG. 5B. The shock absorber 34 providing a stop for the sense of net rotation indicated by arrow 42 is omitted in FIG. 5B for clarity. The array of picking rods 43 is more clearly depicted in FIG. 5B, wherein rods 45 are shown extending upwardly and rearwardly (relative to arrow 44) from a plurality of rod holders 46 which are supported on a rod holder extension 47.

Figure 10:
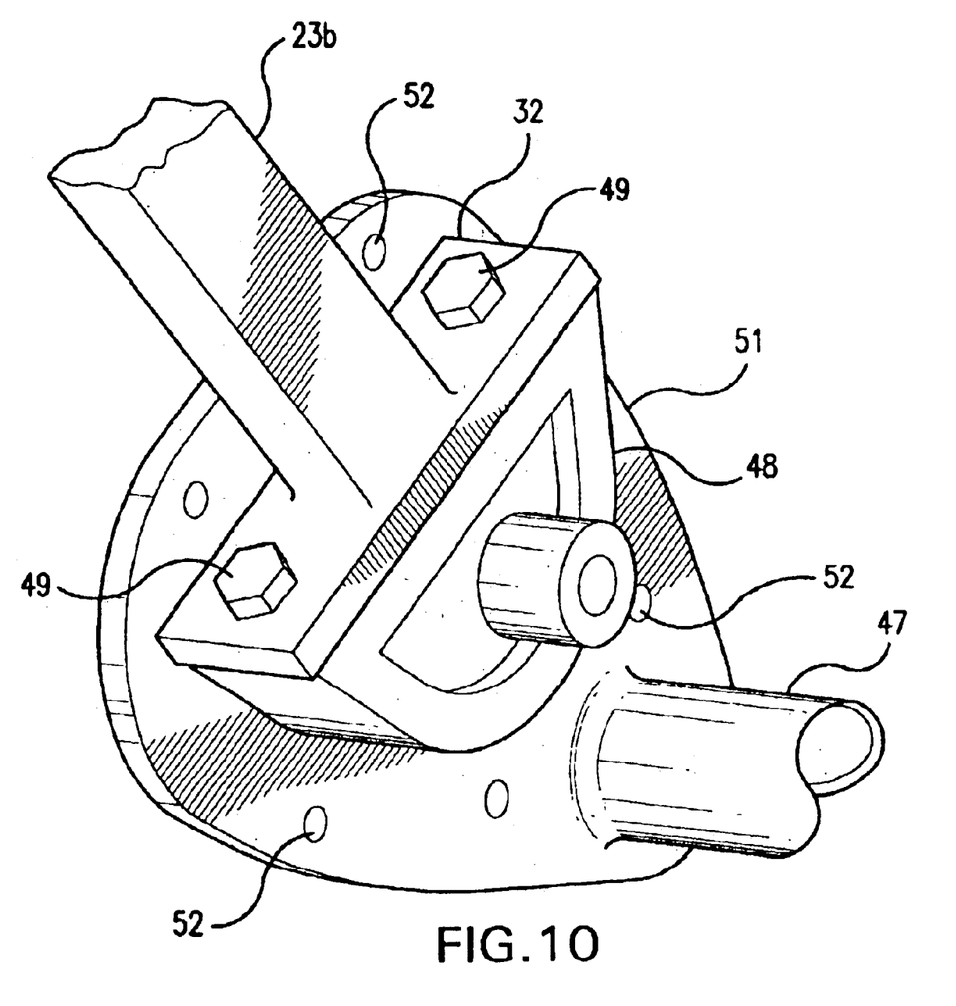
FIG. 10 is a perspective detail of the inside support bearing of the oscillation generating head of the present invention.

With reference now to FIG. 10 of the drawings, an inside oscillation generating head support bearing 48 is shown, which is omitted from FIG. 5B for clarity. The support bearing 48 is attached to the flange 32 on the head support frame arm 23b by means of fasteners such as bolts 49, seen in FIG. 10. It should be recognized that outside oscillation generating head support bearing 33 (FIG. 4) is attached to flange 31 on head support frame arm 23a in a similar fashion. A plate 51 is seen in FIG. 10 having a plurality of holes 52 around the periphery thereof. The holes 52 are arranged in a circular pattern so that the plate 51, which has a somewhat oblong shape, may be mounted on the oscillation generating head 36 container in various rotational positions about central axis 37 of the oscillation generating head. The stub shaft 47, or rod holder extension, is seen in FIG. 5 to extend in a parallel direction to the central axis 37, but displaced therefrom by about 6 inches. It may be seen with reference to FIG. 5B that the displacement provides a slight off-balance for the head 36, wherein the slight off-balance aids the net rotation indicated by arrow 42. Since the head 19 in operation is placed below and to one side of a centerline of a crop row supported by the cordons of FIG. 2 or 3, the net rotation arrow 42 is aided by the unbalance due to the offset of the rod holder extension 47 and therefore urges the tips of the crop contact rods 45 into the overlying vine foliage. The cross arms or cordons 11 and 14 provide a ceiling for the free ends of the crop contact rods 45 so that the contact tips will remain within the foliage to thereby shake the fruit therefrom. Since the rotation indicated by arrow 42 of the oscillation generating head induced by the motor 39 would proceed unchecked if allowed, the rotation is stopped by contact with the shock absorber 34 (FIG. 5A). Any convenient means could be used to provide a stop for the aided rotation in the direction of arrow 42. It may be seen in FIG. 5B that the tips of the contact rods 45 may be raised or lowered by adjustment of the variable length arms 26 and 27, wherein such head height adjustment is in the region of plus or minus 10 inches in a preferred embodiment. It should also be noted that the tips of the contact rods 45 are varied in height by contact with a ceiling provided by the cordons as the rods are urged into the ceiling through an angle of about 40–50', while the net rotation indicated by arrow 42 and aided by the unbalance due to the positioning of the rod holder extension 47, urges the contact rod tips upward, the net rotation and unbalance forces are readily overcome by the contact between the rods and the cordons supporting the vines. In this fashion an automatic adjustment of the position of the contact rods 45 is realized as the cordon heights vary over the length of a vine row. The contact rods are pushed into the foliage until the net rotation and unbalance torque is overcome by the resistance of the vines and the cordons.

It should be emphasized that the unbalance described aids the net rotation to provide quicker response to positioning of the contact rods within the foliage if the rods are ever forced away from the foliage by contact, for example, with a cordon as the harvester frame moves down a vine row. The adjustable arms 26 and 27 provide about a twenty inch vertical range of adjustment of the oscillating head. The net rotation and aiding off-balance provided by the offset of the rod holder extension 47 provides about 45 degrees of rod rotation prior to contact between the oscillation generating head 36 and the shock absorber 34. These features individually or in concert contribute to the automatic adjustment of the contact rod entry into the vine foliage.

Figure 6:
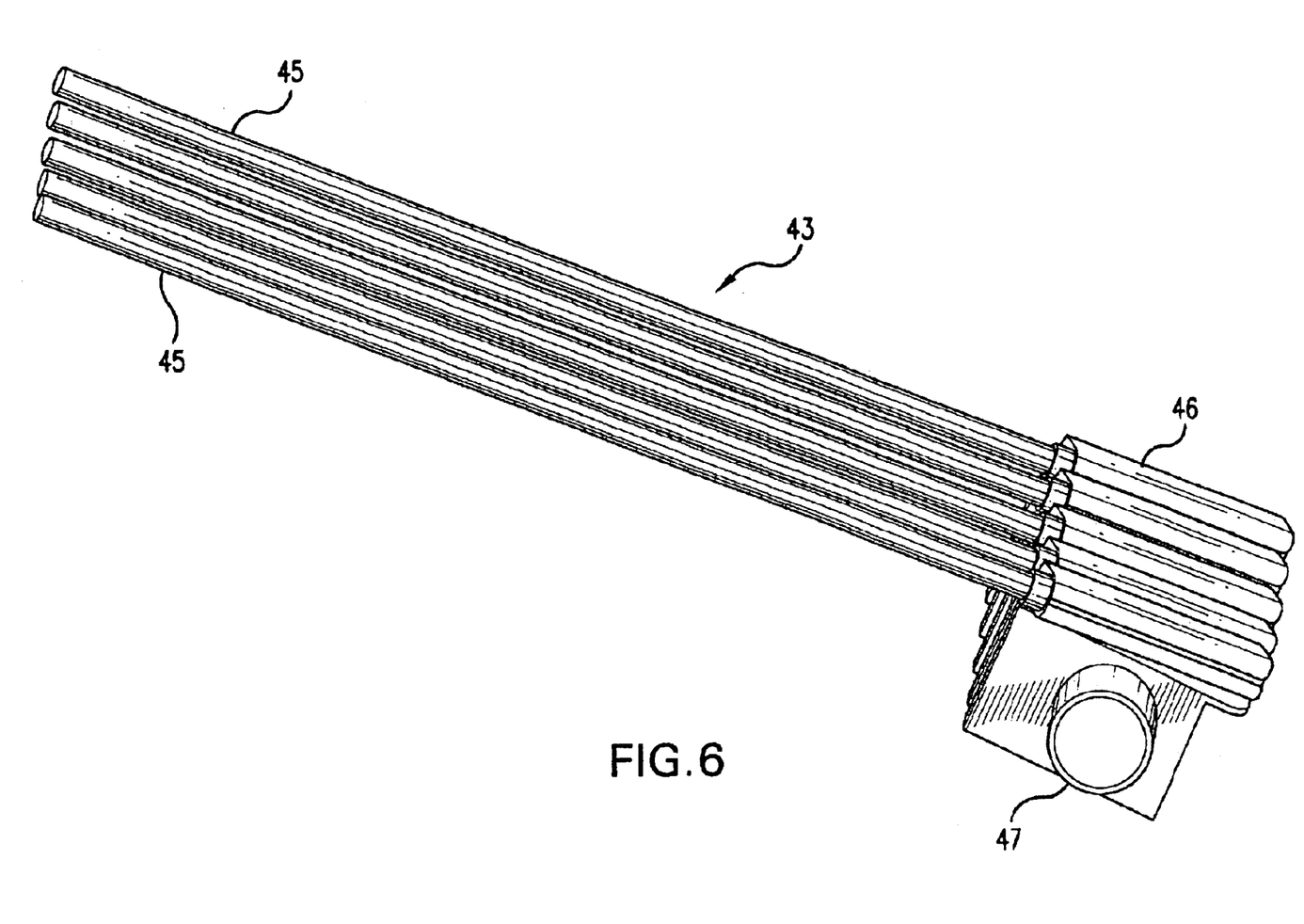
FIG. 6 is a perspective of one embodiment of an array of straight crop contacting rods for use in harvesting from vines supported by the cordon system of FIG. 3.
Figure 7:
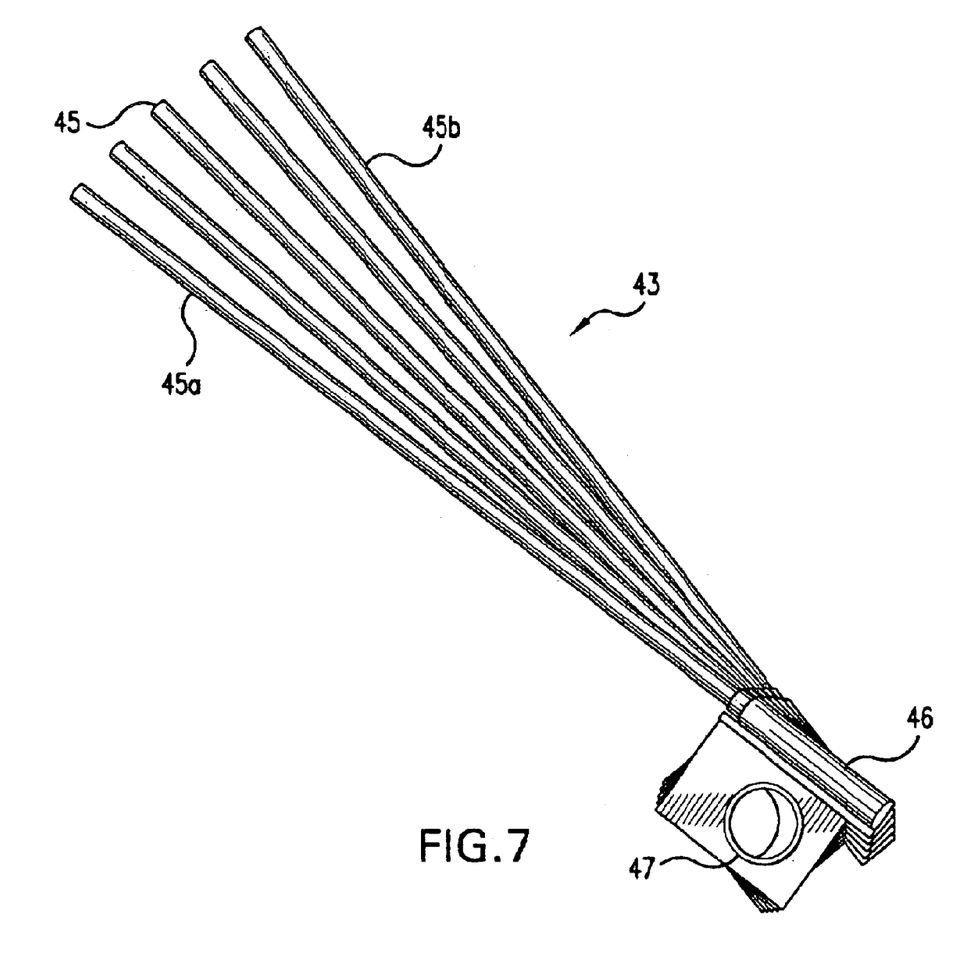
FIG. 7 is a perspective of a straight harvesting rod assembly for use in harvesting vines supported by the cordon system of FIG. 2.

With reference now to FIG. 6 of the drawings, crop contact array 43 is shown, wherein a plurality of fiberglass rods 45 are held in rod holders 46 attached to the rod holder extension 47. The rods, when assembled in the crop picking head assembly 19, extend upwardly and rearwardly as previously explained in conjunction with the description of FIG. 5B. The array of FIG. 6 is used in picking heads performing picking along vine rows supported by straight cordons and associated structure as described for FIG. 3. The crop contact array 43 shown in FIG. 7 also includes straight fiberglass rods 45 held by rod holders 46 and supported on the rod holder extension 47, but the angle of departure of the rods from the extension 47 is such that the inside rod of the rod array represented by rod 45a varies rotationally progressing to the outside of the rod array represented by rod 45b. The crop contact array of FIG. 7 is used when the vine row is supported by the "V" shaped cordons 11 and associated structure, as seen in FIG. 2.

Figure 8:
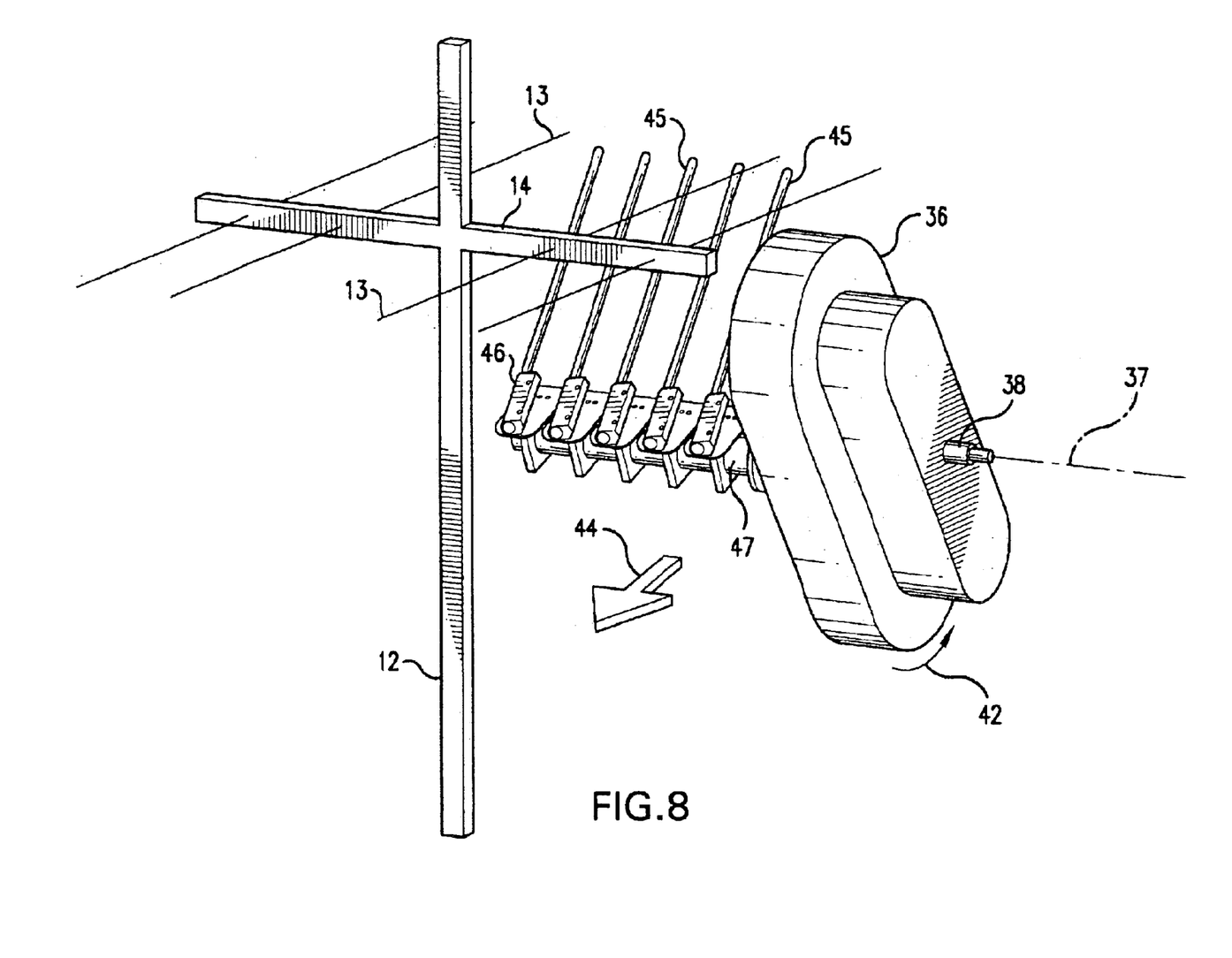
FIG. 8 is a perspective showing the relationship between the harvesting head of the present invention and the cordon system of FIG. 3.

FIG. 8 shows the oscillation generating head 36 without the supporting framework of FIG. 4, to clearly demonstrate the positional relationships between the crop contact rods 45 and the vine supporting row structure including the straight cordons 14 of FIG. 3. It should be noted in FIG. 8 that the crop contacting rods 45 are angled in the rod holder extension 47 so that the tips thereof diverge from the oscillation generating head 36. Thus, the rods are angled toward the centerline of the row of vines supported by the straight cordons 14, and the wires 13, which is approximately the centerline of the crop harvester framework 16 when the crop harvester is driven over the row in the direction of arrow 44 in FIG. 8 during the harvesting process. The rods 45 in contact rod array 43 are urged upwardly by the net rotation indicated by arrow 42 as well as the unbalance imparted about the axis 37 of FIG. 8 by the offset positioning of the rod holder extension 47.

Figure 9:
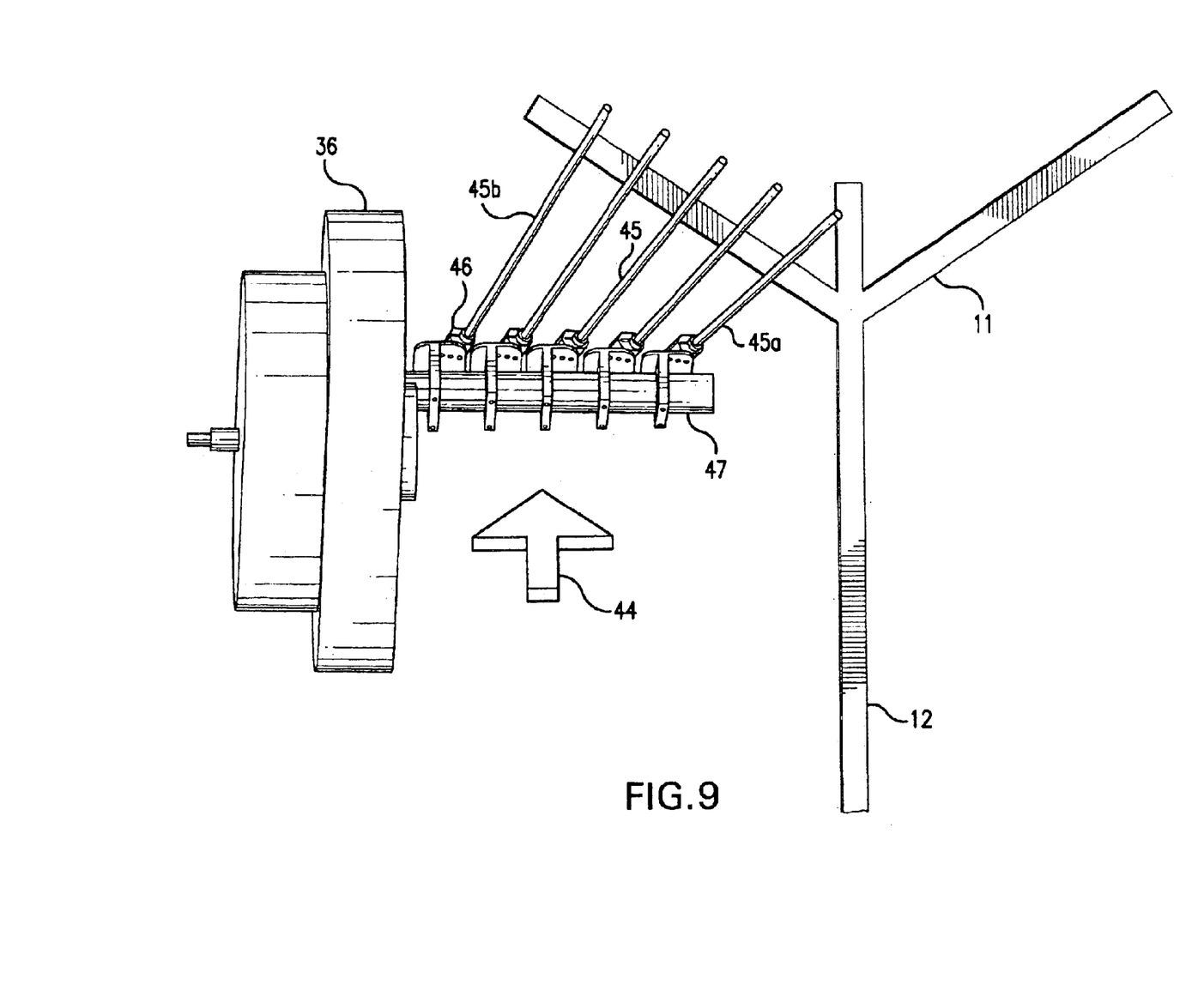
FIG. 9 is a perspective showing the relationship between the harvesting head of the present invention and a cordon system constructed in accordance with FIG. 2.

Turning now to FIG. 9, the "V" shaped cordon 11 is shown supported on the post 12. In such a case, the contact rod assembly 43 takes the form of that shown in FIG. 7. The oscillation generating head 36 carries the rod holder extension 47 on which the contact rods 45 are mounted by rod holders 46 in a fashion so that the rod tips diverge from the oscillating head 36 and approach the centerline of the cordon supported vine row. Inside rod 45a is shown in FIG. 9 closest to the centerline of the vine row and also closest to the centerline of the harvester framework 16 driven down the row in the direction of the arrow 44. Note that the contact rods 45 in FIG. 9 assume positions relative to the adjacent arm of the "V" shaped cordon 11, wherein the tips of the rods are at similar distances from the arm. As in FIG. 8, the rods 45 diverge from the oscillation generating head 36 and converge with the centerline of the vine row and subsequently the centerline of the harvester framework 16 that travels along the vine row in the direction of the arrow 44.

Figure 11:
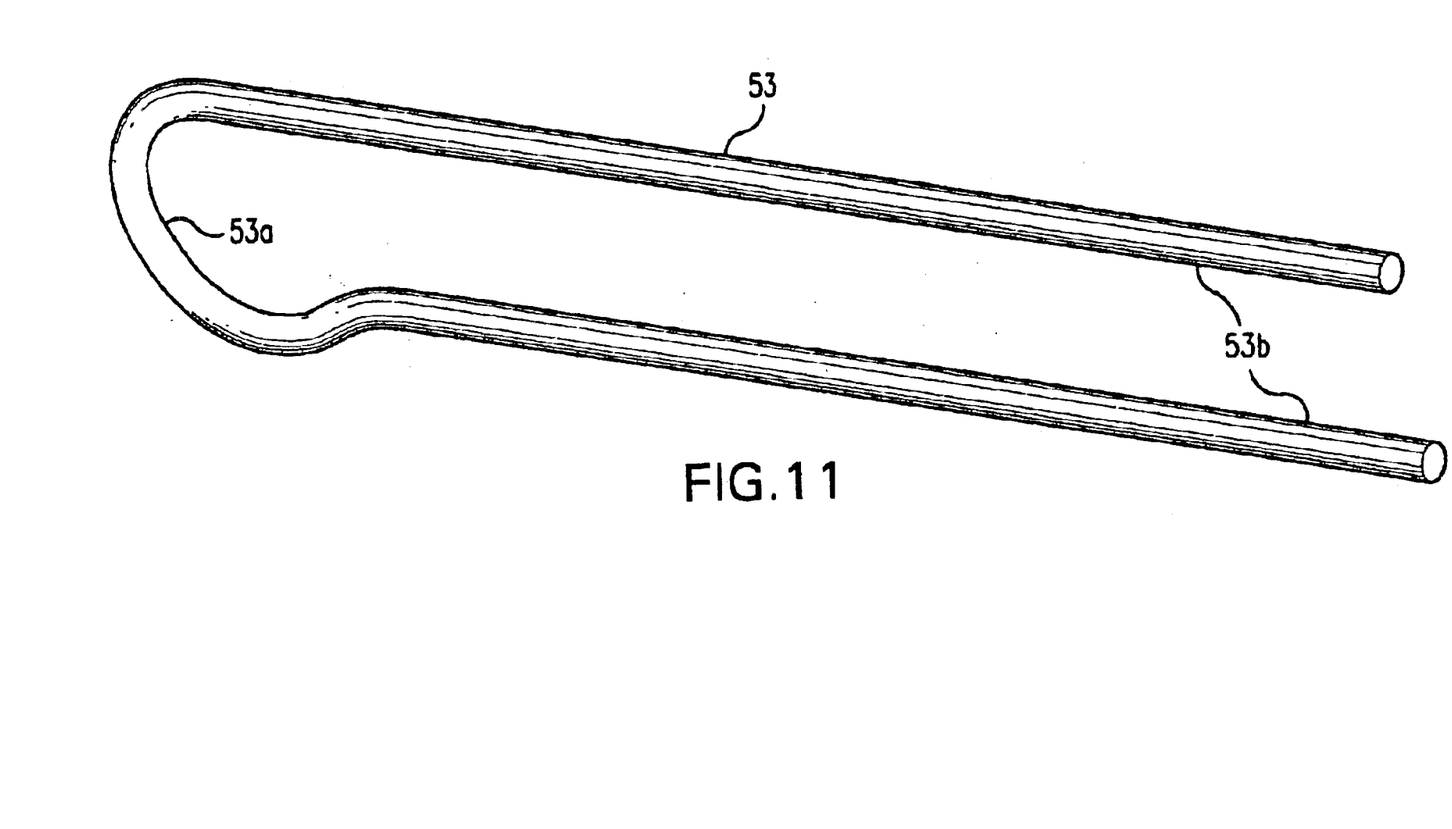
FIG. 11 is a perspective of an alternate configuration of the crop contact rods.

FIG. 11 shows an alternative form of a contact rod, wherein a rod 53 has two legs 53b extending in parallel relationship with a loop end 53a joining the free ends of the extending parallel legs. An appropriate fixture for securing the rod ends at the root end of the looped rods is provided to also secure the root end of the rods 53 to the rod holder extension 47 in a variety of configurations such as those described in conjunction with the straight single contact rods 45.

Referring again to FIG. 1 of the drawings, a second crop picking head assembly 19a is partially shown mounted on the opposite side of the longitudinal centerline of the harvester framework 16 and displaced longitudinally along the harvester framework from the crop picking head 19. The ends of an array 43a of crop contact rods ate also partially shown in FIG. 1 to contact the cordon supported vines on the side of the row opposite from the row engaged by the crop contact rod array 43. While the longitudinal displacement between the picking heads 19 and 19a may not always be necessary, such displacement may afford less damage to the cordon supported vines by longitudinally displacing upward forces exerted on the vines during harvesting. The head 19a is a mirror image of the picking head 19, and the descriptions given heretofore for the picking head 19 apply in like fashion to the head 19a.

Although the best mode contemplated for carrying out the present invention has been shown and described herein, it will be understood that modification and variation may be made without departing from what is regarded to be the subject matter of the invention.

What is claimed is:

1. A crop picking head assembly for mounting in a crop harvester framework configured to travel along an extended row of plant foliage to dislodge a crop growing along the row, comprising an oscillation generating head having an input drive member, an oscillation generating head support frame for mounting said oscillation generating head for rotational oscillation in a substantially vertical plane, a pair of fixed length laterally spaced arms each mounted to the crop harvester framework at an upper end and pivotally attached to said support frame at a lower end, a pair of variable length laterally spaced arms each mounted to the crop harvester framework at an upper end and pivotally attached to said support frame at a lower end, crop contact means mounted on said oscillation generating head in position to approach the plant foliage from beneath, a drive motor mounted on said support frame having a motor output in engagement with said oscillation generating head drive member and providing oscillation generating head net rotation urging said crop contact means into the crop foliage, and a stop member on said support frame for limiting net rotation of said oscillation generating head in said substantially vertical plane.

2. The crop picking head assembly as in claim 1, wherein said crop contact means comprises an array of substantially parallel rods extending upwardly and rearwardly relative to the crop harvester framework travel.

3. The crop picking head assembly as in claim 1, wherein said crop contact means comprises an array of substantially parallel loops extending upwardly and rearwardly relative to the crop harvester framework travel.

4. The crop picking head assembly as in claim 1, wherein said input drive member has a substantially horizontally extending axis passing substantially through the center of mass of said oscillation generating head, and wherein said contact means comprises
    means for mounting said crop contacting means displaced from said horizontal axis so that an unbalance aiding said net rotation is obtained.
5. The crop picking head assembly as in claim 1, wherein said stop member comprises
    a shock absorber.
6. The crop picking head assembly as in claim 2, wherein the extended row of plant foliage is supported by straight cordons, and wherein said array of substantially parallel rods comprises
    tips on said parallel rods disposed at a substantially uniform height.
7. The crop picking head assembly as in claim 3, wherein said array of substantially parallel loops comprises
    loop free ends at a substantially uniform height.
8. The crop picking head assembly as in claim, wherein said crop contact means comprises
    a plurality of substantially parallel members extending rearwardly and upwardly in a direction diverging from said oscillation generating head.
9. A crop picking head assembly for mounting in a crop harvester framework configured to travel along an extended row of plant foliage supported on cordons to dislodge a crop growing along the row, comprising
    an oscillation generating head having a centrally located input drive member,
    an oscillation generating head support frame for mounting said oscillation generating head for rotation in a substantially vertical plane,
    a pair of fixed length laterally spaced arms each mounted to the crop harvester framework at an upper end and pivotally attached to said support frame at a lower end,
    a pair of variable length spaced arms each mounted to the crop harvester framework at an upper end and pivotally attached to said support frame at a lower end,
    crop contact means mounted on said oscillation generating head in position to approach the cordons from beneath and to contact the cordons during oscillation,
    a drive motor mounted on said support frame having a motor output in engagement with said oscillation generating head input drive member and providing oscillation generating head net rotation urging said crop contact means into the crop foliage, and
    stop means mounted on said support frame for limiting net rotation of said oscillation generating head in said substantially vertical plane.
10. The crop picking head assembly as in claim 9, wherein said crop contact means comprises
    an array of substantially parallel rods extending upwardly and rearwardly relative to the crop harvester framework travel.
11. The crop picking head assembly as in claim 9, wherein said crop contact means comprises
    an array of substantially parallel loops extending upwardly and rearwardly relative to the crop harvester framework travel.
12. The crop picking head assembly as in claim 9, wherein said input drive member has a substantially horizontally extending axis passing substantially through the center of mass of said oscillation generating head, and wherein said contact means comprises
    means for mounting said crop contacting means displaced from said horizontal axis so that an unbalance aiding sad net rotation is obtained.
13. The crop picking head assembly as in claim 9, wherein said stop means comprises
    a shock absorber.
14. The crop picking head assembly as in claim 10, wherein the cordons are straight cordons, and wherein said array of substantially parallel rods comprises,
    tips on said parallel rods disposed at a substantially uniform height.
15. The crop picking head assembly as in claim 11, wherein the cordons are straight cordons, and wherein said array of substantially parallel loops comprises
    loop ends at a substantially uniform height.
16. The crop picking head assembly as in claim 9, wherein said crop contact means comprises
    a plurality of substantially parallel members extending rearwardly and upwardly in a direction diverging from said oscillation generating head.
17. The crop picking head assembly as in claim 10, wherein the cordons are "V" shaped cordons, and wherein said array of substantially parallel rods comprises
    tips on said substantially parallel rods at similar distances from one side of said "V".
18. A harvester for crops grown on plant foliage in an extended row and supported on cordons along the row, comprising
    a harvester framework having a longitudinal center line,
    means for supporting said harvester framework and for contacting and affording harvester framework movement along said centerline over an underlying surface,
    power means coupled to said means for supporting for moving said harvester framework over the underlying surface,
    a crop picking head mounted on said harvester framework on one side of said centerline so that said picking head is positionable on one side of the extended row and below the cordons, said crop picking head comprising
    an oscillation generating head having an input drive member,
    an oscillation generating head support frame for mounting said oscillation generating head for rotational oscillation in a substantially vertical plane,
    a pair of fixed length laterally spaced arms each mounted to the crop harvester framework at an upper end and pivotally attached to said support frame at a lower end,
    a pair of variable length laterally spaced arms each mounted to the crop harvester framework at an upper end and pivotally attached to said support frame at a lower end,
    crop contact means mounted on said oscillation generating head in position to approach the plant foliage from beneath,
    a drive motor connected to said power means mounted on said support frame and having a motor output in engagement with said oscillation generating head drive member and providing net rotation of said oscillation generating head urging said crop contact means into the crop foliage, and
    stop means mounted on said support frame for limiting net rotation of said oscillation generating head in said substantially vertical plane.
19. The harvester as in claim 18, wherein said crop contact means comprises an array of substantially parallel rods extending upwardly and rearwardly relative to the crop harvester framework travel.

20. The harvester as in claim 18, wherein said crop contact means comprises an array of substantially parallel loops extending upwardly and rearwardly relative to the crop harvester framework travel.

21. The harvester as in claim 19, wherein said input drive member has a substantially horizontally extending axis passing substantially through the center of mass of said oscillation generating head and wherein said contact means comprises means for mounting said crop contacting means displaced from said horizontal axis so that an unbalance aiding said net rotation is obtained.

22. The harvester as in claim 18, wherein said stop means comprises a shock absorber.

23. The harvester as in claim 19, wherein the cordons are straight cordons, and wherein said array of substantially parallel rods comprises tips on said parallel rods disposed at a substantially uniform height.

24. The harvester as in claim 20, wherein the cordons are straight cordons, and wherein said array of substantially parallel loops comprises loop ends at a substantially uniform height.

25. The harvester as in claim 18, wherein said crop contact means comprises a plurality of substantially parallel members extending rearwardly and upwardly in a direction diverging from said oscillation generating head.

26. The harvester as in claim 19, wherein the cordons are "V" shaped cordons, and wherein said array of substantially parallel rods comprises tips on said substantially parallel rods at similar distances from one side of said "V".

27. The harvester as in claim 18, comprising another crop picking head mounted on said harvester framework in position on the other side of said centerline so that said other picking head is positional on the other side of the extended row and below the cordons.

28. The harvester as in claim 27, wherein said crop picking head and said other crop picking head are spaced along said centerline.

* * * * *